United States Patent [19]

Millar, Jr.

[11] Patent Number: 4,850,770
[45] Date of Patent: Jul. 25, 1989

[54] SIDE RAIL TIE-DOWN ANCHOR

[76] Inventor: Henry E. Millar, Jr., 36717 Government Rd., Dorena, Oreg. 97434

[21] Appl. No.: 249,951

[22] Filed: Sep. 27, 1988

[51] Int. Cl.⁴ ............................................ B61D 45/00
[52] U.S. Cl. .................................. 410/110; 410/116
[58] Field of Search ............... 410/101, 104, 106, 107, 410/108, 109, 110, 111, 112, 113, 114, 116; 296/40, 41, 43; 105/390

[56] References Cited

U.S. PATENT DOCUMENTS

| | | | |
|---|---|---|---|
| 3,351,356 | 11/1967 | Clark et al. | 410/110 |
| 3,421,726 | 1/1969 | Getter | 410/110 |
| 3,623,690 | 11/1971 | Bargman, Jr. | 410/116 |
| 3,950,010 | 4/1976 | Robertson | 410/110 |
| 4,191,108 | 3/1980 | Jones | 410/110 |
| 4,288,188 | 9/1981 | Smith | 296/40 X |
| 4,316,688 | 2/1982 | Roskelley | 410/116 X |
| 4,650,382 | 3/1987 | Johnson | 410/110 |
| 4,760,986 | 8/1988 | Harrison | 410/110 X |
| 4,812,093 | 3/1989 | Millar, Jr. | 410/110 |
| 4,818,162 | 4/1989 | Zukowski et al. | 410/116 |

Primary Examiner—Douglas C. Butler
Attorney, Agent, or Firm—John F. Ingman

[57] ABSTRACT

The present invention provides a tie-down anchor attachable to any location along the side rail of the pickup bed, which anchor includes an L-shaped member having a horizontal leg which extends outwardly across the top of the side rail, and a vertical leg which extends downwards to the inside of the side rail. A tie-down connection member, such as a hook, is attached to the horizontal leg extending upwardly. A hole is formed in the horizontal leg of the L-shaped member between the tie-down connection member and the vertical leg. A U-shaped clamping member has two legs, which define a vertical slot, so that the clamping member may straddle the lip of the side rail, with one leg outside and the other leg beneath the side rail and inside the side rail lip. A vertical hole is formed through the outer leg of the clamping member. A threaded bolt extends through the hole in the horizontal leg of the L-shaped member, through the hole in the outer leg of the clamping member, and is threadingly engaged, so that when the bolt is tightened, the side rail is tightly clamped between the horizontal leg of the L-shaped member and the upper surface of the inner leg of the clamping member, while forcing the inner surface of the vertical leg of the L-shaped member tightly against the outer surface of the outer leg of the clamping member.

4 Claims, 1 Drawing Sheet

U.S. Patent    Jul. 25, 1989    4,850,770
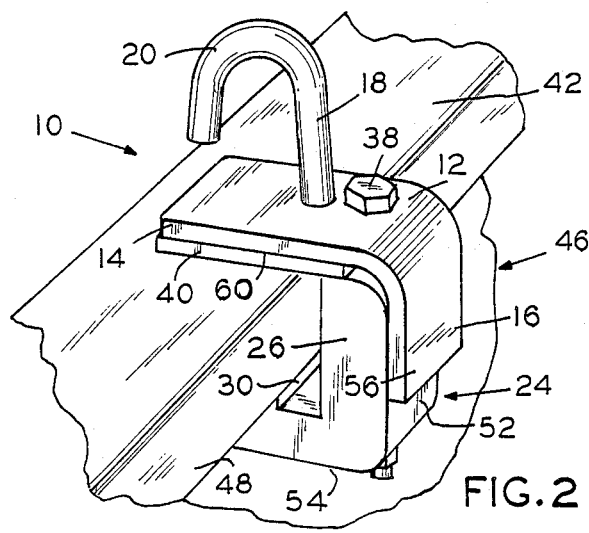
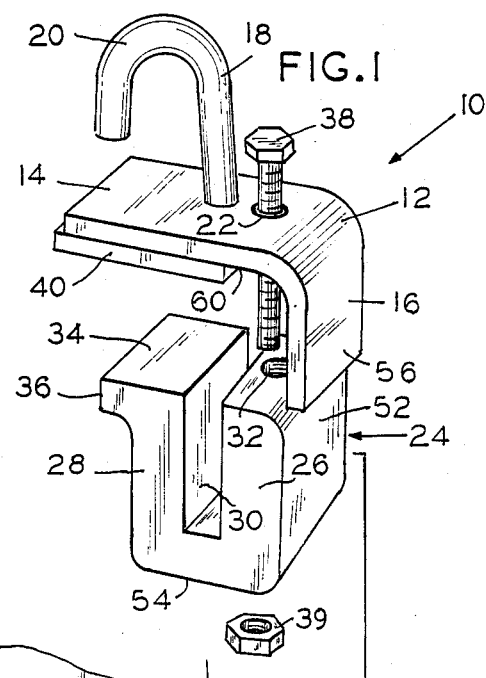
FIG.1
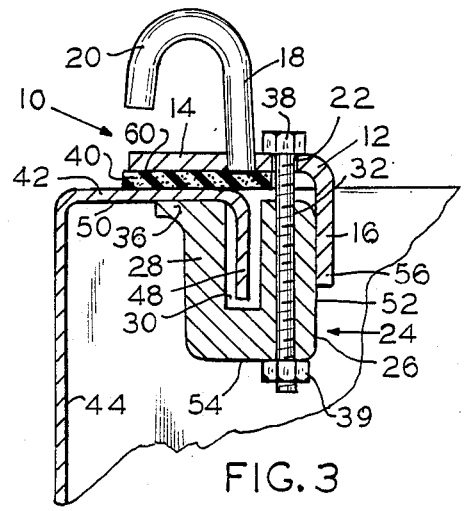
FIG.3
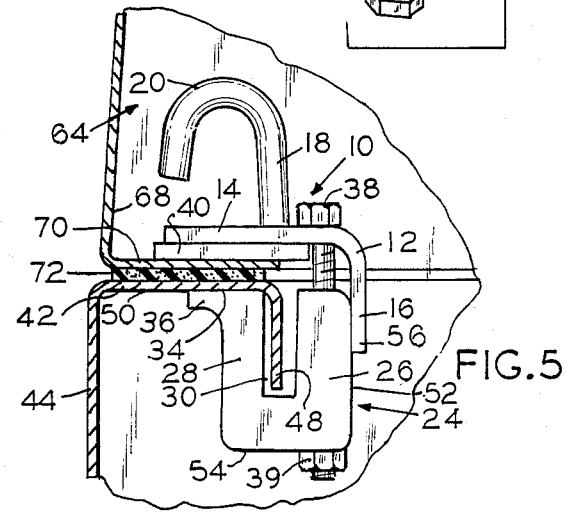
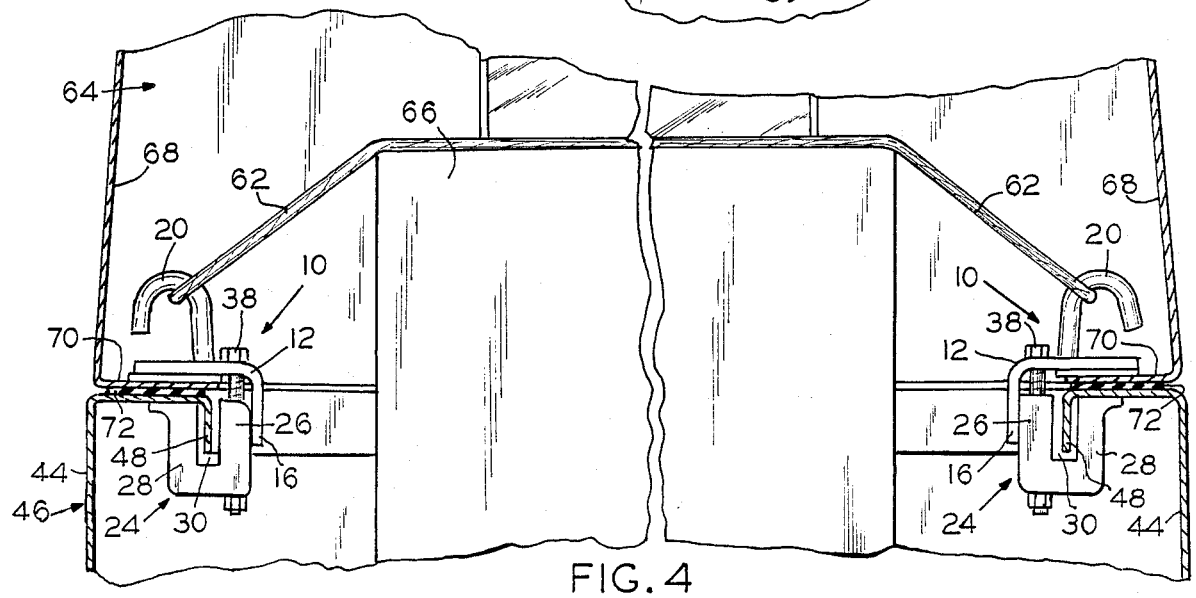
FIG.4

SIDE RAIL TIE-DOWN ANCHOR

BACKGROUND OF THE INVENTION

1. Field of the Invention

This invention involves a tie-down anchor, and, more particularly, a tie-down anchor for pickup trucks which is attached to the side rails of the truck bed.

2. Description of the Prior Art

In general, pickup trucks are manufactured without tie-down anchors to secure loads to the truck beds. Certain stake pocket tie-down anchors have been developed, but these have the limitation of being usable only where a stake pocket is located. Furthermore, many of the smaller trucks currently being produced do not have stake pockets, and threfore, such tie-down anchors cannot be used on these trucks. Other tie-down anchors are available which may be permanently attached to the bed of the pickup by bolts or machine screws, but such tie-down anchors may require undesirable drilling on the exterior surface of the bed, and if merely fastened by machine screws, have a tendency to rip out under the stress of a heavy load. Whether a stake pocket tie-down anchor or permanently installed anchor, such conventional tie-down anchors are located in fixed postiions, making it difficult to adequately secure some loads.

When a canopy is used, there still remains a need to secure a load inside the canapy. Currently available tie-down anchors generally are not suitable for use with a canopy. In particular, stake pocket tie-down anchors physically interfere with the installation of the canopy upon the side rails of the pickup bed.

What is needed is an improved tie-down anchor for pickups which:

is usable without stake pockets;
does not require modification to the pickup, such as holes drilled in the bed;
is easily installable and removable;
is strong, durable, and capable of restraining heavy loads;
can be easily installed at or repositioned to any point along the side rails of the pickup bed in order to properly secure any load; and
can be used to secure loads with a canopy installed.

SUMMARY OF THE INVENTION

The present invention provides a tie-down anchor designed to satisfy the aforementioned needs. The side rail tie-down anchor is removably attachable to the side rail of the pickup bed at multiple locations.

Accordingly, the invention includes a L-shaped member having a horizontal leg which extends outwardly across the top of the pickup bed side rail, and a vertical leg which extends downwards to the inside of the side rail. A tie-down connection member, such as a hook or eye, attached to the horizontal leg, extends upwardly so as to be available for a tie-down line. A hole is formed in the horizontal leg of the L-shaped member between the tie-down connection member and the vertical leg. A U-shaped clamping member has two legs, which define a vertical slot between these legs. The vertical slot in the clamping member has a depth equal to or greater than the height of the downwardly extending lip of the pickup bed side rail and a width greater than the thickness of that lip, so that the clamping member may straddle the lip of the side rail, with one leg outside and the other leg beneath the side rail and inside the side rail lip. A vertical hole is formed through the outer leg; the inner leg preferably has a flat upper surface. A threaded bolt extends through the hole in the horizontal leg of the L-shaped member, through the hole in the outer leg of the clamping member, and engages a threaded nut, so that when the bolt is tightened, the side rail will be tightly clamped between the horizontal leg of the L-shaped member and the upper surface of the inner leg of the clamping member, while at the same time forcing the inner surface of the vertical leg of the L-shaped member tightly against the outer surface of the outer leg of the clamping member. The side rail tie-down anchor thus may be rigidly and securely positioned at any location along the side rail of the pickup bed.

A protective pad may be attached to the underside of the horizontal leg of the L-shaped member to protect the finish of the pickup bed side rail.

BRIEF DESCRIPTION OF THE DRAWINGS

FIG. 1 illustrates a perspective view of a side rail tie-down anchor.

FIG. 2 shows a side rail tie-down anchor as installed along the pickup bed side rail.

FIG. 3 provides a cross-sectional view of the installed side rail tie-down anchor as seen at 3—3 of FIG. 2.

FIG. 4 illustrates the side rail tie-down anchor in use with a canopy installed on the pickup bed.

FIG. 5 illustrates an enlarged view of a canopy being held to the side rails by the tie-down anchor.

DESCRIPTION OF THE PREFERRED EMBODIMENT

Referring now to the drawings, there is shown in FIG. 1 the preferred embodiment of the side rail tie-down anchor 10. An L-shaped member 12, made of a strong, durable material such as steel, has a horizontal leg 14 and a vertical leg 16. A tie-down connection member 18, preferably a hook 20 as illustrated, but which may be an eye or other form to which a tie-down line may pass through or be connected, is attached to the horizontal leg 14 so as to extend upwardly therefrom. A hole 22 is formed in the horizontal leg 14 of the L-shaped member 12 between the tie-down connection member 18 and the vertical leg 16. A clamping member 24 has two legs 26 and 28 defining a vertical slot 30. The outer leg 26 has a vertical hole 32 longitudinally formed through it, and the inner leg 28 preferably has a flat upper surface 34. The inner leg 28 may have an extending lip 36 which increases the area of its upper surface 34. The clamping member 24 may be formed of any suitable material, both cast aluminum and injected nylon having produced satisfactory results. A bolt 38 penetrates the hole 22 formed in the horizontal leg 14 of the L-shaped member 12, proceeding through the hole 32 in the outer leg 26 of the clamping member 24, and engages into a nut 39. Alternatively, though less preferred due to cost, the hole 32, or a portion thereof, may be threaded (not shown). A protective pad 40, such as foam rubber, may be adhesively added, as illustrated, to the horizontal leg 14 of the L-shaped member 12.

Most full-size and many compact pickup trucks have side rails 42 which extend inwardly from the side wall 44 of the pickup bed 46. Characteristically, such side rails 42 terminate with a downwardly extending lip 48. The side rails 42 with downwardly extending lips 48 normally extend the length of the side wall 44 on both sides of the pickup bed 46.

FIG. 2 illustrates a portion of the side rail 42 of a pickup bed 46 whereon the side rail tie-down anchor 10 has been installed. FIG. 3 provides a cross sectional view of this attachment. The vertical slot 30 in the clamping member 24 has a depth equal to or greater than the height of the downwardly extending lip 48 and a width greater than the thickness of that lip 48, so that the clamping member 24 may be raised without obstruction to straddle the extending lip 48, with the upper surface 34 of its inner leg 28 pressing against the undersurface 50 of the side rail 42. With the clamping member 24 thus positioned, the L-shaped member 12 is placed so that the horizontal leg 14 lays atop the side rail 42 and the vertical leg 16 is adjacent to the outer surface 52 of the outer leg 26 of the clamping member 24, as illustrated. Bolt 38 is inserted through hole 22 formed in L-shaped member 12 and through hole 32 formed in the outer leg 26 of the clamping member 24 so as to extend from the bottom surface 54 of the outer leg 26 of the clamping member 24, where it engages nut 39. Tightening of the bolt 38 and nut 39 results in the clamping of the side rail 42 between the horizontal leg 14 of the L-shaped member 12 and the upper surface 34 of inner leg 28 of the clamping member 24. Furthermore, the tightening of bolt 38 and nut 39 biases the lower end 56 of the vertical leg 16 tightly against the outer surface 52 of the outer leg 26 of the clamping member 24, thus rigidly securing the position of the L-shaped member 12 and tie-down connection member 18 relative to the clamping member 24 and the side rail 42.

As noted above, a protective pad 40, such as made of foam rubber, may be adhesively added to the underside 60 of leg 14 to protect the finish of the pickup bed 46 side rail 42.

When tie-down lines 62 are not used, or the tie-down anchor 10 is not desired, removal of the single bolt 38 will permit removal and storage of the side rail tie-down anchor 10. Installation and removal of the tie-down anchor 10 thus is rapid and simple.

Since the side rail 42 with downwardly extending lip 48 is generally continuous along the side wall 44 of the pickup bed 46, tie-down anchors 10 may be applied, in the number and location as desired, to restrain any particular load. This is a significant advantage over conventional tie-down anchors. Furthermore, most conventional tie-down anchors, e.g., stake pocket anchors, cannot be utilized with a canopy, the canopy either covering the tie-down anchor attachment points or interfering with the tie-down connection member. However, with the present side rail tie-down anchor 10, a canopy 64 can be utilized while still restraining the load 66 underneath the canopy 64. This is best appreciated as seen in FIG. 4, where the location of the tie-down anchor 10 is inside of the outer canopy wall 68 so as to clear the hook 20 for tie-down use, and the tie-down anchor 10 is clampingly applied across both the side rail 42 and the inwardly extending canopy flange 70.

A further advantage of the present invention is that the installation of the tie-down anchor 10 across both the side rail 42 and the inwardly extending canopy flange 70 also provides a means for fastening the canopy 64 securely against the side rail 42 of the pickup bed 46, thus supplementing, or possibly eliminating, the need for conventional means (not shown) for attaching the canopy 64 to the pickup bed 46. FIG. 5 illustrates an enlarged view of such tie-down anchor 10 clamping of the canopy 64 to the pickup bed 46, a conventional canopy seal 72 having been added for weatherization and finish protection.

It is thought that the side rail tie-down anchor of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:

1. A tie-down anchor, for use in combination with the side rail of a pickup bed or the like, where the side rail has a lip extending downwardly from its inner edge, the tie-down anchor comprising:
   (a) an L-shaped member having a horizontal leg and a vertical leg;
   (b) a tie-down connection member attached to the horizontal leg of the L-shape member and extending upwardly so as to be available for a tie-down line;
   (c) a hole formed in the L-shaped member on the horizontal leg between the location of said tie-down connection member and the vertical leg;
   (d) a clamping member having two legs, a first or outer leg and a second or inner leg which define a vertical slot between said legs; said slot being of depth of equal to or greater than the length of the downward extension of the lip of the side rail and of a width greater than the thickness of said lip; the outer leg having an outer surface opposing said slot; a hole being longitudinally formed through the first or outer leg of the clamping member; and the upper end of the second or inner leg of the clamping member being a clamping surface; and,
   (e) a threaded bolt extending through the hole in the horizontal leg of the L-shaped member and through the hole in the first or outer leg of the clamping member into a threaded engagement;
   (f) so that upon tightening said bolt the side rail is tightly clamped between the horizontal leg of the L-shaped member and the upper surface of the second or inner leg of the clamping member, and the vertical leg of the L-shaped member is forced tightly against the outer surface of the first or outer leg of the clamping member.

2. A tie-down anchor, as recited in claim 1, wherein the tie-down connection member is in the form of a hook.

3. A tie-down anchor, as recited in claim 1, wherein an extending lip is formed on the upper end of the second or inner leg of the clamping member so as to extend the upper surface thereof and provide an extended clamping surface.

4. A tie-down anchor, as recited in claim 1, wherein a protective pad is adhesively joined to the horizontal leg, so as to protect the finish of the side rail during use.

* * * * *